(12) United States Patent
Belleschi et al.

(10) Patent No.: US 11,329,839 B2
(45) Date of Patent: May 10, 2022

(54) METHODS AND DEVICES HANDLING MULTICAST FEEDBACK

(71) Applicant: TELEFONAKTIEBOLAGET LM ERICSSON (PUBL), Stockholm (SE)

(72) Inventors: Marco Belleschi, Solna (SE); Johan Bergman, Stockholm (SE); Stefano Sorrentino, Solna (SE); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 174 days.

(21) Appl. No.: 16/089,632

(22) PCT Filed: Mar. 30, 2017

(86) PCT No.: PCT/SE2017/050306
§ 371 (c)(1),
(2) Date: Sep. 28, 2018

(87) PCT Pub. No.: WO2017/171616
PCT Pub. Date: Oct. 5, 2017

(65) Prior Publication Data
US 2019/0123923 A1    Apr. 25, 2019

Related U.S. Application Data

(60) Provisional application No. 62/317,186, filed on Apr. 1, 2016.

(51) Int. Cl.
*H04L 1/14* (2006.01)
*H04L 12/18* (2006.01)
(Continued)

(52) U.S. Cl.
CPC .............. *H04L 12/189* (2013.01); *H04L 1/00* (2013.01); *H04L 1/08* (2013.01); *H04L 1/1671* (2013.01);
(Continued)

(58) Field of Classification Search
CPC . H04L 12/189; H04L 1/00; H04L 1/08; H04L 1/1671; H04L 1/1861;
(Continued)

(56) References Cited

U.S. PATENT DOCUMENTS

2008/0008212 A1* 1/2008 Wang ........................ H04L 1/24
370/503
2010/0232339 A1* 9/2010 Jung ...................... H04L 1/1692
370/312
(Continued)

FOREIGN PATENT DOCUMENTS

WO    2007148934 A1    12/2007
WO    2008024544 A2    2/2008

OTHER PUBLICATIONS

International Search Report and Written Opinion dated Jun. 26, 2017 in related International Application No. PCT/SE2017/050306.
(Continued)

*Primary Examiner* — Christine T. Tu
(74) *Attorney, Agent, or Firm* — Sage Patent Group

(57) ABSTRACT

UEs are configured to transmit feedback related to data received on a multicast traffic channel on dedicated resources. Network nodes are configured to retransmit the data based on the received feedback.

39 Claims, 8 Drawing Sheets

(51) Int. Cl.
*H04L 1/18* (2006.01)
*H04L 1/16* (2006.01)
*H04L 1/00* (2006.01)
*H04W 4/40* (2018.01)
*H04W 76/27* (2018.01)
*H04L 1/08* (2006.01)
*H04W 72/04* (2009.01)
*H04W 72/08* (2009.01)

(52) U.S. Cl.
CPC .............. *H04L 1/1861* (2013.01); *H04W 4/40* (2018.02); *H04W 72/0413* (2013.01); *H04W 72/085* (2013.01); *H04W 76/27* (2018.02); *H04L 2001/0093* (2013.01)

(58) Field of Classification Search
CPC   H04L 2001/0093; H04W 4/40; H04W 76/27; H04W 72/0413; H04W 72/085
USPC ........ 714/748, 750, 745; 370/241, 242, 248, 370/249
See application file for complete search history.

(56) References Cited

U.S. PATENT DOCUMENTS

| | | | |
|---|---|---|---|
| 2015/0201326 A1* | 7/2015 | Kazmi | H04W 8/24 370/329 |
| 2016/0095067 A1* | 3/2016 | Jurzak | H04W 52/04 370/311 |
| 2016/0119178 A1* | 4/2016 | Terry | H04L 1/203 370/216 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 12)," 3GPP TS 36.213 V12.9.1, Mar. 2016.

* cited by examiner

METHODS AND DEVICES HANDLING MULTICAST FEEDBACK

TECHNICAL FIELD

Embodiments of the subject matter disclosed herein generally relate to increasing reliability of multicast transmissions in a wireless communication network by enabling recipients of multicast transmissions to provide feedback.

BACKGROUND

The following abbreviations are used in this document:
AS Application Server
BM-SC Broadcast Multicast—Service Center
CAM Cooperative Awareness Message
CC Component Carrier
CQI Channel Quality Information
CSI Channel State Information
D2D Device-to-Device
DENM Decentralized Environmental Notification Message
ECGI E-UTRAN Cell Global Identifier
eNB Evolved NodeB
GCSE Group Communication Service Enabler
HARQ Hybrid Automated Repeat Request
LCID Logical Channel Index
LTE Long-Term Evolution
MAC Medium Access Control
MBMS Multimedia Broadcast/Multicast Service
MBSFN MBMS Single-Frequency Network
MCPTT Mission-Critical Push To Talk
MCS Modular Coding Scheme
MTCH Multicast Transport Channel
NW Network
PDSCH Physical Downlink Shared Channel
PHICH Physical Hybrid-ARQ Indicator Channel
ProSe Proximity-Based Services
PUCCH Physical Uplink Control Channel
PUSCH Physical Uplink Shared Channel
RAN Radio Access Network
RLC UM Radio Link Control Unacknowledged Mode
RRC Radio Resource Control
RSRP Reference Signal Received Power
RSU Roadside Unit
SC-PTM Single-Cell Point to Multipoint
SIB System Information Block
SPS Semi-Persistent Scheduling
SR Scheduling Request
TMGI Temporary Mobile Group Identity
TPC Transmit Power Control
UE User Equipment
USD User Service Description
V2I Vehicle-to-Infrastructure
V2N Vehicle-to-Network
V2P Vehicle-to-Pedestrian
V2V Vehicle-to-Vehicle
V2x Vehicle-to-everything, i.e., x may stand for "V," "I" or "P"

LTE ProSe Applications and V2x

Release 12 (Rel-12) of the LTE standard includes support of D2D (specified as "sidelink") features for both commercial and Public Safety applications. Devices operating according to Rel-12 LTE are enabled to establish a connection with another device in the proximity and associated application by broadcasting and detecting discovery messages that carry device and application identities. Applications may rely on direct communication based on physical channels terminated directly between devices. In 3GPP, these kinds of applications are defined under the umbrella of Proximity Services (ProSe).

ProSe framework provides support for V2x communication, a term which includes any combination of direct communication between vehicles, pedestrians and infrastructure. V2x communication may take advantage of an NW infrastructure, when available, but basic V2x connectivity should at least be possible even in the event of lack of coverage. Providing an LTE-based V2x interface may be economically advantageous because of LTE economies of scale, and it may enable tighter integration between communications with V2I, V2P and V2V, as compared to using a dedicated V2x technology.

V2x communications may carry both non-safety and safety information, where each of the applications and services may be associated with specific requirements sets, e.g., in terms of latency, reliability, capacity, etc. FIG. 1 illustrates different types of V2x communications/services.

The tem) V2V refers to communications between vehicles. V2V applications are predominantly broadcast-based. V2V may be realized by either direct communication between devices in the respective vehicles, or via infrastructure such as a cellular network. An example of V2V is the transmission of a cooperative awareness message (CAM) with vehicle status information (such as position, direction and speed) repeatedly transmitted to other vehicles within proximity (every 100 ms-1 s). Another example of V2V is the transmission of a decentralized environmental notification message (DENM), which is an event-triggered message to alert vehicles. These two examples are taken from the ETSI Intelligent Transport Systems (ITS) specification of V2x applications, which also specifies the conditions under which the messages are generated. Most V2V applications have tight requirements on latency that can vary from 20 ms (e.g., for pre-crash warning messages) to 100 ms for other road safety services.

The term V2I refers to communications between vehicles and a Roadside Unit (RSU). The RSU is a stationary transportation infrastructure entity which communicates with vehicles in its proximity. An example of V2I is transmission of speed notifications from the RSU to vehicles, as well as queue information, collision risk alerts and curve speed warnings. Due to the safety-related nature of V2I, delay requirements are similar to V2V requirements.

The term V2P (vehicle-to-pedestrian) refers to communications between vehicles and vulnerable road users, such as pedestrians, using V2P applications. V2P typically takes place between distinct vehicles and pedestrians either directly or via infrastructure such as a cellular network.

The term V2N (vehicle-to-network) refers to communications between a vehicle and a centralized application server (or an ITS Traffic Management Center) both using V2N applications, via infrastructure (such as a cellular network). An example of a V2N application is sending a bad road condition warning to all vehicles in a wide area, or a traffic flow optimization in which the V2N application suggests speeds to vehicles and coordinates traffic lights. Therefore, V2N messages are supposed to be controlled by a centralized entity (i.e., the Traffic Management Center) and provided to vehicles in a large geographical area, rather than in a small area. Additionally, unlike V2V/V2I, latency requirements are more relaxed in V2N (e.g., a 1 s latency requirement is typically satisfactory), because V2N is meant to be used for non-safety purposes.

Multimedia Broadcast/Multicast Service in E-UTRAN

The Multimedia Broadcast/Multicast Service (MBMS) aims to provide an efficient mode of delivery for both broadcast and multicast services over the core network. MBMS was introduced in the second release of the LTE specifications (Release 9), although the initial Release 8 physical layer specifications were already designed to support MBMS by including essential components to ensure forward-compatibility.

The LTE MBMS feature is largely based on what was already available in UTRAN (from Release 6) and GERAN with both simplifications and enhancements. In the most general sense, broadcasting is the distribution of content to an audience of multiple users. In the case of mobile multimedia services, it is an efficient transmission system for the simultaneous delivery of content to large groups of mobile users. Typical broadcast content can include newscasts, weather forecasts or live mobile television, now extended into the LTE E-UTRAN system.

FIG. 2 is a scheme of the network architecture for the Group Communication System Enabler (GCSE) in the roaming scenario. MBMS is a key component in enabling group communication. The key network entity includes the GCS server, where the traffic goes toward BM-SC (Broadcast-Multicast Service Center) to MBMS GW (MBMS Gateway) to E-UTRAN to UE. Here, the service can be provided by either unicast or multi-cast in a flexible way, decided by the GCS AS (application server) (where the unicast bearer is routed back to P-GW of H-PLMN). Group communication is, for instance, the base of Mission-Critical Push-To-Talk (MCPTT) applications where a mission-critical group of users (e.g., police, ambulance, rescue teams, etc.) can reach in a wide area a large number of other users belonging to the same group.

From the Radio Access Network (RAN) perspective, MBMS transmissions can be realized with two different techniques: MBSFN (i.e., MBMS Single-Frequency Network) and SC-PTM (i.e., Single-Cell Point to Multipoint).

In MBSFN, the same content of an MBMS bearer (which corresponds to a specific service identified with the TMGI indicator) is transmitted from different cells belonging to the same MBMS area, which can span a very large area. Transmissions from the different cells are time-synchronized so that the resulting signal will, from a terminal point of view, appear as a transmission from a single cell. In order to realize such combining gain at the UE, all the cells joining the same MBMS session should coordinate their scheduling decisions. In MBSFN, the scheduler is not located in the eNB, but in the MCE node, which can coordinate scheduling allocations for multiple eNBs. MBSFN transmissions occur over a dedicated multicast transport channel (MCH) over which both control signaling (MCCH) and data (MTCH) are multiplexed. There is a one-to-one association between MTCH and TMGI.

In SC-PTM, multicasting of MBMS data is not executed simultaneously from multiple cells as in MBSFN, but is limited to a single cell area. Multicast transmissions (both control signaling and data) are sent over PDSCH and scheduled by the eNB. There is a one-to-one association between SC-MTCH and TMGI.

Since V2x is predominantly a broadcast service, MBMS is an appealing technique to distribute V2x messages in a certain area to all of a possibly large number of UEs. However, the MBMS framework does not consider the possibility of retransmissions at lower layers, i.e., no HARQ retransmissions at MAC layer and only RLC UM at RLC layer.

Hybrid Automatic Repeat Request (HARQ)

Hybrid Automatic Repeat Request (HARQ) is a mechanism used in LTE to handle retransmission of missing or erroneously transmitted packets. The HARQ procedure consists of providing feedbacks (ACK/NACK) to the transmitter on a transport block basis, thereby offering the possibility of successfully decoding a transport block very quickly. The probability of eventually decoding with success a given packet is enforced by the soft combining technique that enforces the HARQ operation. In particular, a receiver implementing the soft combining scheme stores the erroneously received packet and later combines it with the retransmitted replicas of that packet requested by the HARQ feedback. Such replicas contain the same data as the original transport block but a different set of coded bits obtained with different redundancy versions, i.e., by using a different puncturing pattern of the code.

In legacy LTE, the uplink HARQ feedbacks (ACK/NACK) are conveyed by the Physical Hybrid-ARQ Indicator Channel (PHICH) channel that is transmitted by the eNB upon detection of an uplink transmission on the Physical Uplink Shared Channel (PUSCH) by the UE. Further, in legacy LTE, the downlink HARQ feedbacks (ACK/NACK) are conveyed by the Physical Uplink Control Channel (PUCCH) that is transmitted by the UE upon detection of a downlink transmission on the Physical Downlink Shared Channel (PDSCH) by the eNB.

PUCCH Format in LTE

In LTE Rel-8, PUCCH format 1/1a/1b and PUCCH format 2/2a/2b are supported for SR, HARQ-ACK and periodic CSI reporting. The PUCCH resource is represented by a single scalar index, from which the phase rotation and the orthogonal cover sequence (only for PUCCH format 1/1a/1b) are derived. The use of a phase rotation of a cell-specific sequence together with orthogonal sequences provides orthogonality between different terminals in the same cell transmitting PUCCH on the same set of resource blocks.

In LTE Rel-10, PUCCH format 3 was introduced for carrier aggregation for FDD and TDD, when there are multiple downlink transmissions, (either on multiple carriers or multiple downlink subframes) but single uplink (either single carrier or single uplink subframe) for HARQ-ACK, SR and CSI feedback. Similarly, the PUCCH format 3 resource is also represented by a single scalar index from which the orthogonal sequence and the resource-block number can be derived. A length-5 orthogonal sequence is applied for PUCCH format 3 to support code multiplexing within one resource-block pair, and a length-4 orthogonal sequence is applied for shorted PUCCH. The PUCCH format 3 resource is determined according to higher layer configuration and a dynamic indication from the downlink assignment. In detail, the TPC field in the DCI format of the corresponding PDCCH/EPDCCH is used to determine the PUCCH resource values from one of the four resource values configured by higher layers. For FDD, the TPC field corresponds to the PDCCH/EPDCCH for the scheduled secondary serving cells. For TDD, the TPC field corresponds to the PDCCH/EPDCCH for the primary cell with a DAI value in the PDCCH/EPDCCH larger than '1'. A UE shall assume that the same PUCCH resource values are transmitted in each DCI format of the corresponding PDCCH/EPDCCH assignments.

In 3GPP up to Rel-12, the maximum downlink component carriers are 5. For HARQ-ACK feedback, PUCCH format 1b with channel selection and PUCCH format 3 have enough capability to feedback the HARQ-ACK for all configured carriers. However, in Rel-13, maximum 32 downlink carriers can be configured for one UE and, hence, at least one new PUCCH format will be introduced to carry more HARQ-ACK bits due to the aggregation of 32 DL CCs.

The following distinct embodiments enabling HARQ feedbacks to multi-cast transmissions may be combined in any way. The description relies on multicast channels' names in the LTE specifications, but the concept can be applied to any multicast downlink channel and associated signaling.

In current LTE, no retransmission mechanism is currently available for Multimedia Broadcast/Multicast Service (MBMS). Retransmissions would increase reliability and is of particular interest for V2x applications such as crash warnings, road safety, cooperative automated driving, etc. They could benefit from retransmissions because service reliability would increase. Retransmissions can be beneficial also for other scenarios besides V2x.

Introducing HARQ retransmissions in the MBMS framework is challenging, for example, because the eNB might not know which (SC)-MTCH channel the UE is monitoring. Therefore, even if HARQ feedback is sent, the eNB might not know on which channel to retransmit. Additionally, since V2x scenarios are supposed to be characterized by high load, it is important to limit control signaling overhead.

Further, according to 3GPP TS 36.213, existing PUCCH format only associates PUCCH resources to the serving cell (up to two in PUCCH format 1b) and to the transport block (up to two per serving cell) being ACKed/NACKed. No mechanism to associate PUCCH resources to TMGI is specified.

In order to increase reliability of multicast transmissions in a wireless communication network, particularly for (but not limited to) V2x applications, it is desirable to develop methods and devices enabling a feedback mechanism for multicast transmissions.

SUMMARY

In various embodiments described in this document, methods and devices provide a feedback mechanism for multicast transmissions in a wireless communication network.

According to an embodiment, there is a method performed by a UE. The method includes receiving data from a network node on a Multicast Traffic Channel, MTCH and transmitting feedback related to the data received on the MTCH to the network node.

According to another embodiment, there is a UE having a receiver, a transmitter, a processor and a memory storing instructions executable by the processor. The processor executing the instructions controls the receiver to receive data from a network node on a MTCH, and controls the transmitter to transmit feedback related to the data received on the MTCH to the network node.

According to another embodiment, there is a method performed by a network node broadcasting or multicasting data to a plurality of UEs. The method includes transmitting the data via a MTCH, receiving feedback related to the data from at least one of the UEs, and determining whether to retransmit the data based on the feedback.

According to yet another embodiment, there is network node having a receiver, a transmitter, a processor and a memory storing instructions executable by the processor. The processor executing the instructions controls the transmitter to transmit data to a plurality of UEs via a MTCH, controls the receiver to receive feedback relating to the transmitted data from at least one of the UEs, and determines whether to retransmit the data based on the feedback.

According to another embodiment, there is a computer program for a UE. The computer program includes at least a receiving module configured to receive data from a network node on a MTCH, and a transmitting module configured to transmit feedback related to the data received on the MTCH to the network node. This computer program may be stored on a computer-readable medium. The computer-readable medium may be a recording medium or a non-transitory medium. The medium storing the program may be characterized as a computer program product.

According to yet another embodiment, there is a computer program for a network node. The computer program includes a transmitting module configured to broadcast or multi-cast data via a MTCH, to a plurality of UEs, a receiving module configured to receive feedback related to the data from at least one of the UEs, and an evaluation module configured to determine whether to retransmit the data based on the feedback. This computer program may be stored on a computer-readable medium. The computer-readable medium may be a recording medium or a non-transitory medium. The medium storing the program may be characterized as a computer program product.

BRIEF DESCRIPTION OF THE DRAWINGS

The accompanying drawings, which are incorporated in and constitute a part of the specification, illustrate one or more embodiments and, together with the description, explain these embodiments. On the drawings.

DETAILED DESCRIPTION

Figure 1:
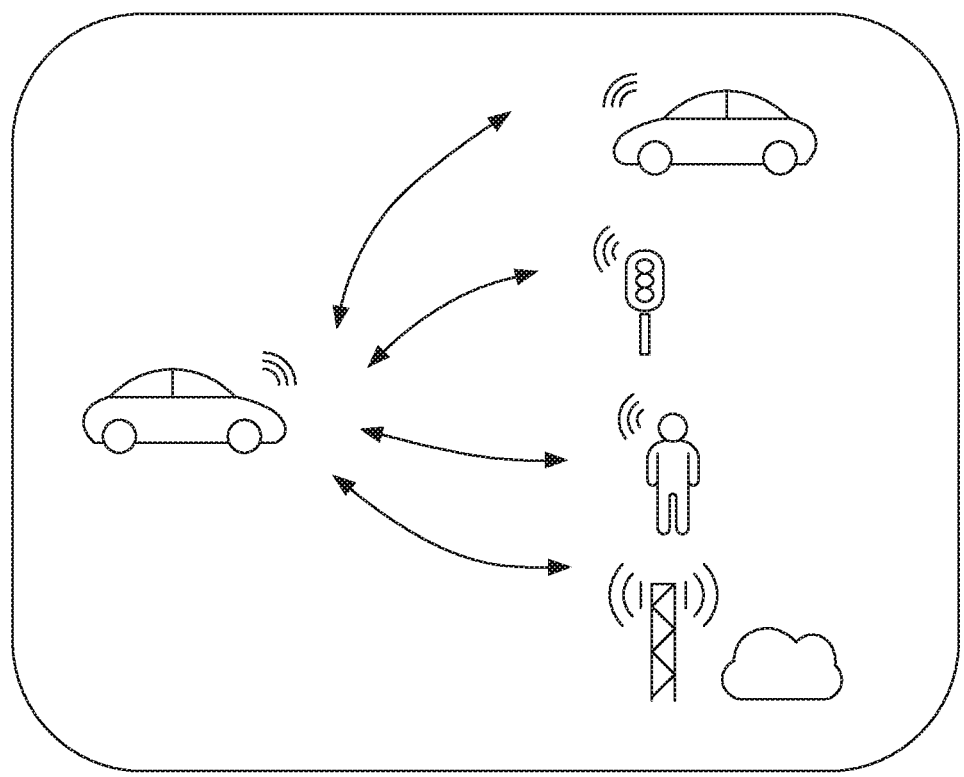
FIG. 1 illustrates different types of V2x communications.
Figure 2:
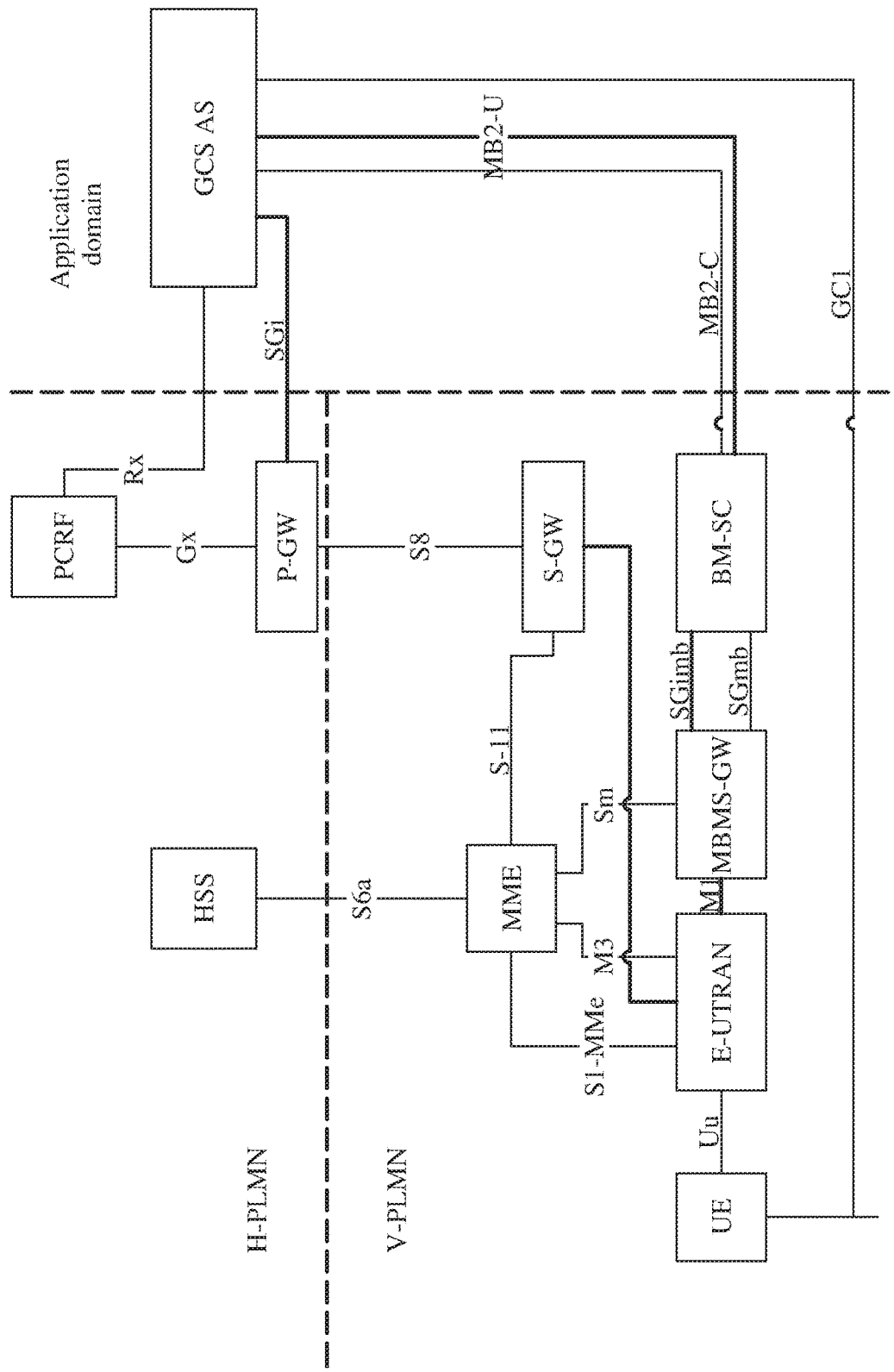
FIG. 2 is a scheme of the network architecture for the GCSE in the roaming scenario.

The following description of the embodiments refers to the accompanying drawings. The same reference numbers in different drawings identify the same or similar elements. The following detailed description does not limit the invention. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Features, structures or characteristic described as being separate may be combined into a single feature, structure, or characteristic. Similarly, features, structures or characteristics described as being individual may be split into two or more features, structures or characteristics.

In some embodiments, the eNB (or another network node) configures specific PUCCH resource(s) shared by multiple UEs receiving the same MTCH (which may be SC-MTCH). A PUCCH resource may correspond to a scalar index representing a certain phase rotation and orthogonal cover sequence. The mapping may be equivalently based on the TMGI or the associated (SC)-MTCH. The following refers to MTCH for brevity.

The PUCCH resource(s) to be used for each MTCH may be provided in dedicated signaling to the UEs, assuming that the eNB knows which UEs are participating in reception of the MTCH (e.g., the eNB may read in the MBMSInterestIndication the TMGI of interest for the UE). Also providing a PUCCH resource by broadcast may be used (i.e., the eNB provides the PUCCH resource(s) associated with each (SC)-MTCH in SIB or other broadcast control channel). In this way, as soon as the UE enters connected mode, it is able to send feedback on PUCCH to the eNB.

Several UEs in a cell may receive data on a certain MTCH, and then use common specific PUCCH resource(s) configured for that MTCH. This commonality is clearly advantageous from a signaling overhead perspective.

In order to avoid the same resource being used both for NACK and ACK, in one embodiment, a given PUCCH resource may only be used either for NACK or ACK transmission. Therefore, two separate PUCCH resources associated with each MTCH may be defined, one for ACKs and one for NACK. Alternatively, a single resource is defined and used for NACK transmission, while ACK is not reported.

Multiple PUCCH resources for a given MTCH may be defined, and UE access to each resource may be based on UE-specific parameters. For example, UEs with downlink RSRP fulfilling certain criteria (e.g., below a threshold) may only access one of the PUCCH resources, and so on. This is a way of ensuring that UEs use different PUCCH resources depending on their position or reception quality. Such information in the reports may be exploited by the eNB. For example, if the UE uses certain PUCCH resources depending on its RSRP, the eNB would also infer the RSRP experienced by the UE.

Figure 3:
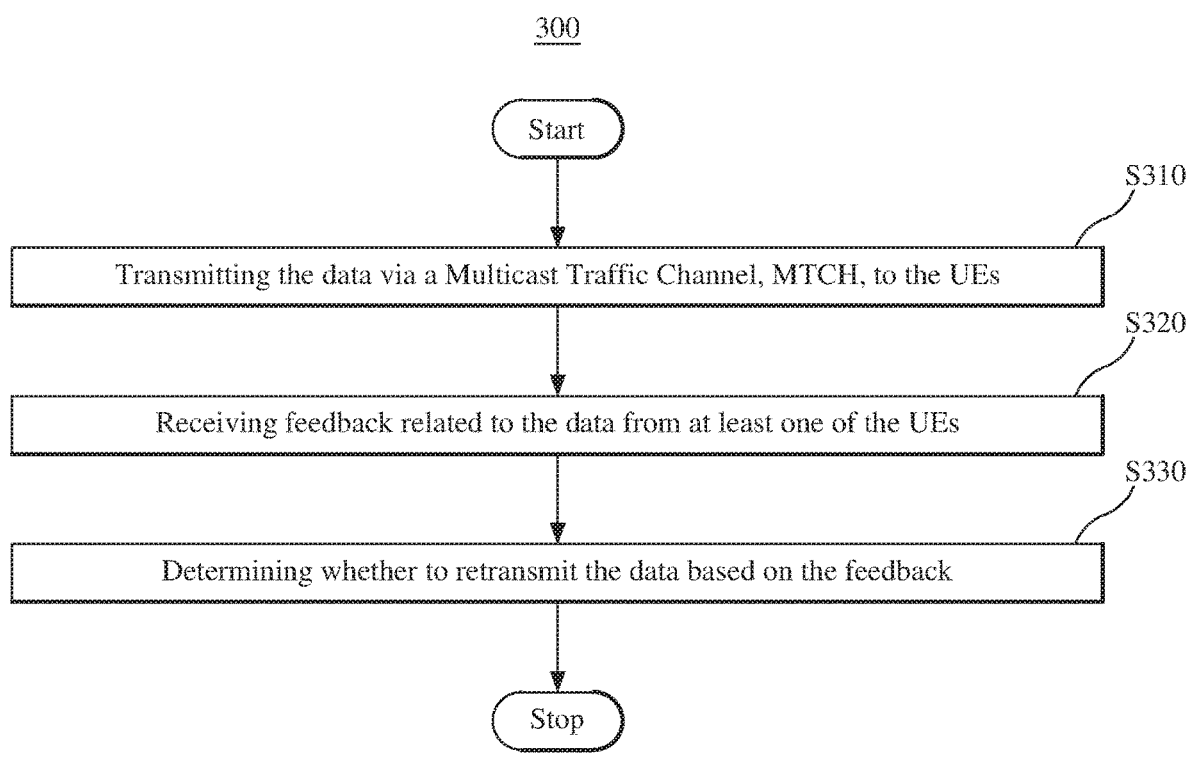
FIG. 3 is a flowchart of a method performed by a UE according to an embodiment.

FIG. 3 is a flowchart of a method 300 performed by a UE. Method 300 includes receiving vehicle-to-everything-related (V2x) data from a network node on a MTCH, at S310 and transmitting feedback related to the data received on the MTCH to the network node at 320.

The method may also include receiving an indication of a table associating Physical Uplink Control Channel (PUCCH) resources with MTCHs respectively, prior to (as fields of a row in a table) step 310. The term "table" here should be understood as one or more associations of items, and not to a particular data structure. The feedback is transmitted on a PUCCH resource, which, according to the table, is associated with the MTCH on which the data was received.

The UE may receive the indication of the table via a broadcast message, via Radio Resource Control (RRC) signaling, or via dedicated signaling. The table may associate the MTCH with a first PUCCH resource used when the feedback is a positive acknowledgment, and/or a second PUCCH resource used when the feedback is a negative acknowledgment. At least one PUCCH resource is represented as a phase rotation and an orthogonal cover sequence.

Method 300 may further include evaluating a UE-dependent criterion to select a PUCCH resource among two or more PUCCH resources associated with the MTCH according to the table, to transmit the feedback using the selected PUCCH resource. In some embodiments, this evaluation may include performing a measurement (e.g., an RSRP measurement).

In some embodiments, method 300 further includes determining whether the data was received with errors. If errors are detected, the feedback is then a negative acknowledgment. The negative acknowledgement would then trigger retransmission of the data. The retransmission may be received by multicast or unicast.

The feedback may be one or more of: an ARQ- or HARQ-related positive or negative acknowledgment, a combination of ARQ- or HARQ-related positive or negative acknowledgments, CQI for the MTCH, and CSI for the MTCH.

The table may associate the PUCCH resource(s) with the MTCH corresponding to the TMGI of a multicast session being monitored by the UE, where the specific PUCCH resource(s) to be used depend on the number of MTCHs being monitored by the UE at a given time. The table with the mapping between a PUCCH resource and a specific MTCH may be provided by the eNB or at least in part the provided PUCCH resources may be used in the priority order of the MTCHs being monitored, where the priority is indicated by the LCID associated to the MTCH.

The UE performing the above methods may operate in an RRC connected mode.

Figure 4:
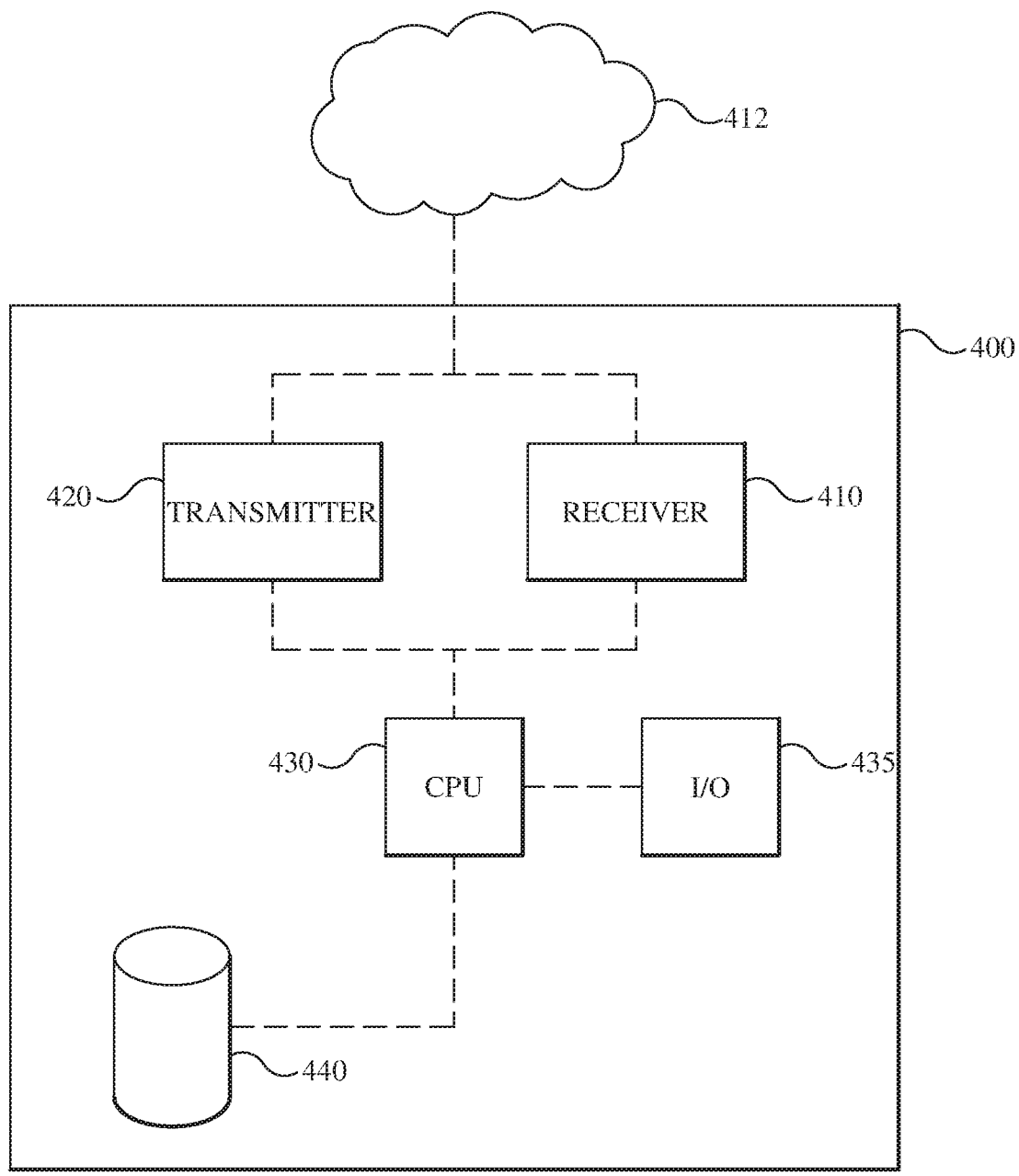
FIG. 4 is a schematic diagram of a UE configured to perform various methods described in this document, according to an embodiment.

FIG. 4 is a schematic diagram of a UE 400 configured to execute any of the previously described feedback methods. UE 400 includes a receiver 410, a transmitter 420, a processor 430 and a memory 440. The network node communicates with other devices via network 412, and may have an I/O interface 435. Memory 440 stores instructions executable by processor 430 to perform feedback methods. Such a feedback method includes controlling the receiver to receive data from a network node on an MTCH, and controlling the transmitter to transmit feedback related to the data received on the MTCH to the network node. The UE may be a wireless mobile device and may be a vehicle-mounted device, or a pedestrian-carried device.

In the above-described embodiments, multiple UEs use a common shared PUCCH resource depending on the specific MTCH for which feedback is provided. Once the eNB detects some energy in a PUCCH resource, the eNB is configured to detect whether data sent on a MTCH has or has not been properly received by at least one UE.

Some embodiments are characterized by an eNB detecting and using energy level on the PUCCH resource. The eNB may compare the received energy levels with several different detection thresholds at the receiver, to estimate how many of the UEs did or did not correctly receive multicast data. For example, assuming that only NACKs are sent, the eNB may use one low-energy threshold corresponding to a minimum number of UEs, and a higher energy threshold. If the detected energy is below the minimum threshold, then no retransmissions are executed. If the detected energy is above the minimum threshold and below the higher energy threshold, then data is retransmitted in unicast mode. If the detected energy is above the higher energy threshold, then data is retransmitted in multicast mode. If the eNB detects also ACKs, the energy detected for ACKs can be compared with the energy detected for NACKs to decide whether retransmissions are worthwhile or not.

If multiple PUCCH resources are defined per MTCH and their selection is based on UE-specific parameters/measurements (e.g., RSRP), the eNB may take such information into account when deciding the transmission format for a (re) retransmission of the data. For example, if UEs with bad RSRP fail to receive a MTCH transmission, the retransmission may be performed with a more efficient MCS transmission format.

In some embodiments, PUCCH resources are selected by the UE depending on the TMGI/MTCH being received by the UE. In PUCCH format 1b with channel selection, up to four transport blocks can be used. Such transport blocks should be mapped to the TMGIs/(SC)-MTCH (up to 4 if PUCCH format 1b is used). The eNB can provide the UE with explicit mapping, or the provided resources can be used in the priority order of the LCID of the (SC)-MTCH.

If PUCCH format 1b is used, various possible combinations of ACK/NACK can be reported for the received MTCHs. If all MTCHs are ACKed, the HARQ feedback can be skipped.

For example, the configuration can be as specified in the following table, where A represents the amount of MTCH received (up to 4 in PUCCH format 1b). Note that MTCH 1 indicates, for example, the lowest MTCH LCID received in a certain subframe, MTCH2 the second lowest, and so on. The table with the mapping between a PUCCH resource and a specific MTCH may be provided by the eNB or at least in part the provided PUCCH resources may be used in the priority order of the MTCHs being monitored, where the priority is indicated by the LCID associated to the MTCH.

The following table illustrates mapping of Transport Block and MTCH to HARQ-ACK(j) for PUCCH format 1b HARQ-ACK channel selection, according to an embodiment:

| A | HARQ-ACK(j) | | | |
|---|---|---|---|---|
|  | HARQ-ACK(0) | HARQ-ACK(1) | HARQ-ACK(2) | HARQ-ACK(3) |
| 2 | MTCH 1 | MTCH 2 | N/A | N/A |
| 3 | MTCH 1 | MTCH 2 | MTCH 3 | NA |
| 4 | MTCH 1 | MTCH 2 | MTCH 3 | MTCH 4 |

The features of the above-described embodiments may be implemented for feedback mechanisms other than HARQ-related ACK/NACK, such as, CQI/CSI reports for (SC)-MTCH.

Figure 5:
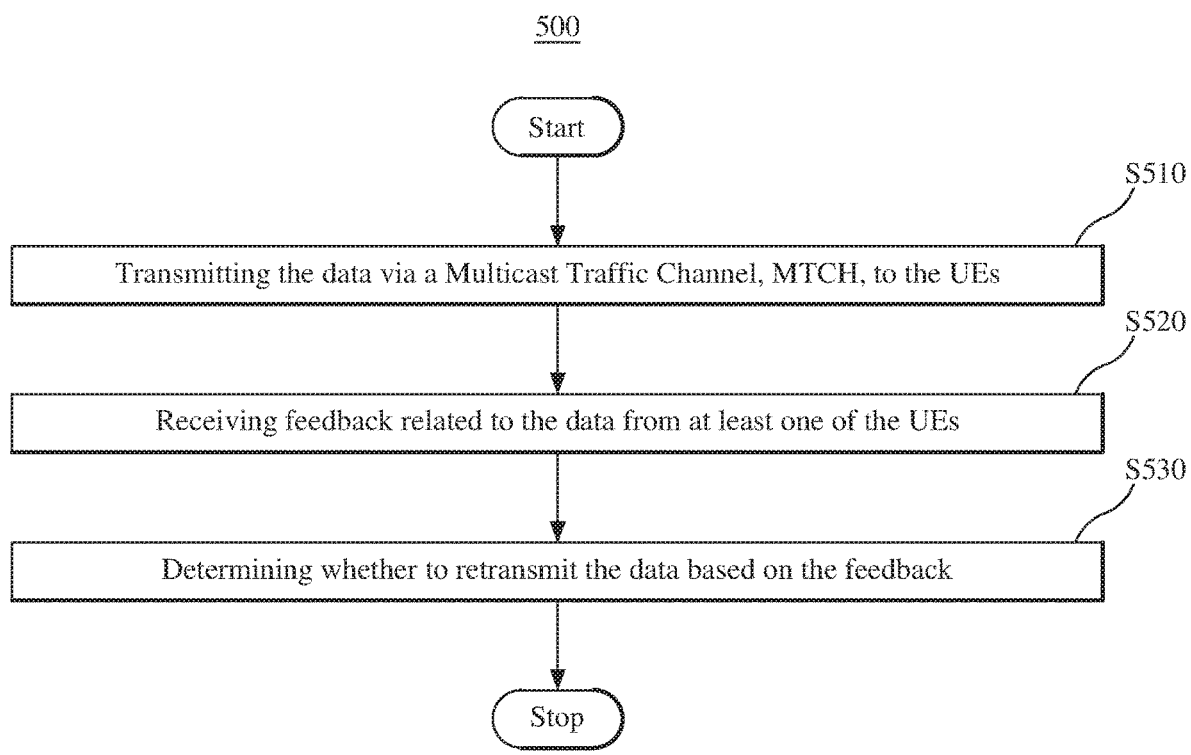
FIG. 5 is a flowchart of a method performed by a network node according to another embodiment.

FIG. 5 is a flowchart of a method 500 performed by a network node broadcasting or multicasting data to a plurality of UEs according to an embodiment. Method 500 includes transmitting the data via an MTCH to the UEs at S510 and receiving feedback related to the data from at least one of the UEs at S520. Method 500 further includes determining whether to retransmit the data based on the received feedback at S530.

The method may further include sending an indication of a table associating Physical Uplink Control Channel (PUCCH) resources with MTCHs respectively, prior to transmitting said data. The feedback is received on a PUCCH resource, which, according to the table, is associated with the MTCH on which data was transmitted. The table may associate the MTCH with two or more PUCCH resources to be selected for feedback based on a UE-dependent criterion. The MTCH may be specified in the table using a TGMI. At least one PUCCH resource may be represented as a phase rotation and an orthogonal cover sequence.

In some embodiments, reception of the feedback may include detecting a received energy on each PUCCH resource associated with the MTCH, and determining whether to retransmit the data then includes comparing the detected received energy with at least one threshold (which, for example, may be determined based on the number of UEs in the plurality of UEs). The energy detected on one PUCCH resource may be compared with two thresholds to decide not to retransmit the data, to retransmit the data by multicast, or to retransmit the data by unicast directed to one or more of the UEs from which a negative acknowledgment has been received.

In one embodiment, the network node detects a first energy on a first PUCCH resource and a second energy on a second PUCCH resource, the first and second PUCCH resources being associated with the MTCH according to the table. The network node then determines whether to retransmit the data by comparing the first energy with the second received energy.

Receiving the feedback may include receiving a positive feedback from a UE, fulfilling the UE-dependent criterion on a first one of said PUCCH resources, and/or receiving a negative feedback from a UE, not fulfilling the UE-dependent criterion on a second one of said PUCCH resources.

The method may further include selecting a Modulation Coding Scheme (MCS) for retransmitting the data based on estimating a number of UEs that fulfill the UE-dependent criterion and from which the received feedback is a negative acknowledgment.

In one embodiment, if two or more MTCHs are used to transmit data to the UEs, with each of the two or more MTCHs associated with a logical channel index (LCID). The feedback may be received in a predefined format in which fields are populated with MTCH-wise feedback entries according to a predefined rule dependent on LCIDs associated with the MTCHs, respectively. The predefined format may be PUCCH format 1b.

The received feedback may be one or more of an ARQ- or HARQ-related positive or negative acknowledgment, a combination of ARQ- or HARQ-related positive or negative acknowledgments, a CQI for the MTCH, and a CSI for the MTCH.

The method may further include selecting whether to retransmit the data by unicast or multicast based on the feedback. For example, the selection may be based on the number of UEs indicating that retransmission is needed (i.e., negative feedback).

Figure 6:
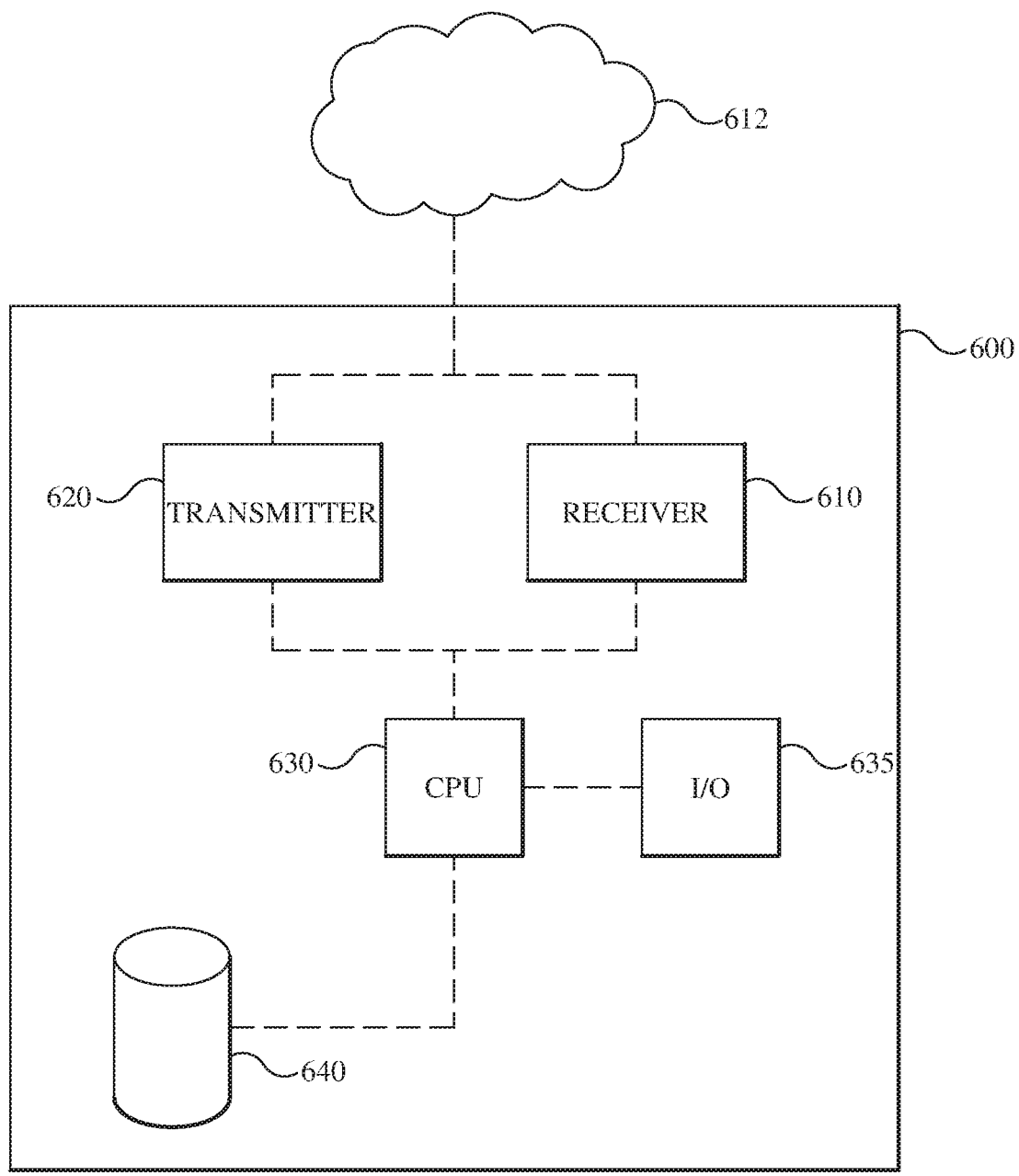
FIG. 6 is a schematic diagram of a network node configured to operate as described in this document.

FIG. 6 is a network node 600 configured to execute any of the above-described methods. Network node 600 includes a receiver 610, a transmitter 620, a processor 630 and a memory 640. The network node communicates with other devices via network 612, and may have an I/O interface 635. Memory 640 stores instructions executable by the processor to control a transmitter to transmit data to a plurality of UEs using a MTCH, to control the receiver to receive feedback related to the transmitted data from at least one of the UEs, and to determine whether to retransmit the data based on the feedback. The network node may be a base station. It may also operate as a centralized application server and/or a stationary transportation infrastructure entity.

Figure 7:
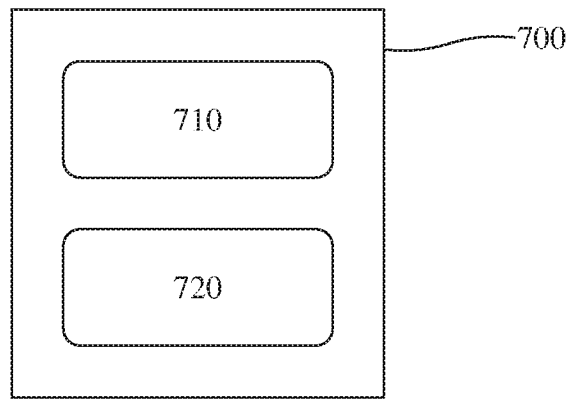
FIG. 7 is a block diagram of computer program product for a UE according to an embodiment.

FIG. 7 is a block diagram of a computer program product 700 for performing one of feedback methods by a UE. The computer program product includes at least a receiving module 710 configured to receive data from a network node on a MTCH, and a transmitting module 720 configured to transmit feedback related to the data received on the MTCH to the network node. The modules are hardware and/or software. The computer program product may be stored on a computer-readable recording medium such as memory 440.

Figure 8:
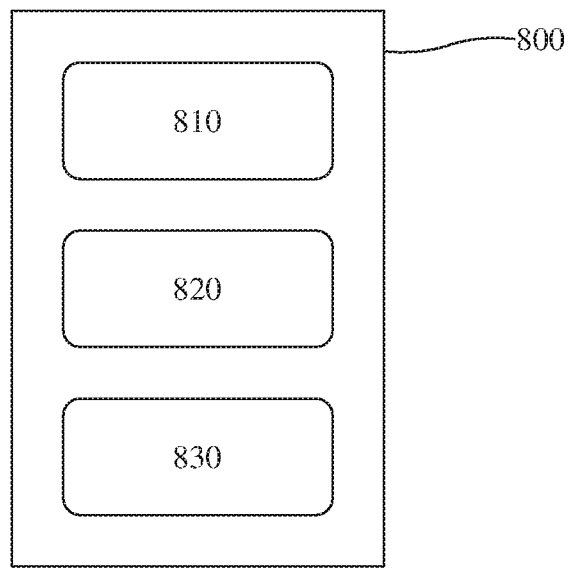
FIG. 8 is a block diagram of computer program product for a network node according to an embodiment.

FIG. 8 is a block diagram of a computer program product 800 for performing one of feedback-related methods by a network node. The computer program product includes at least a transmitting module 810 configured to broadcast or multicast data via an MTCH to a plurality of UEs, a receiving module 820 configured to receive feedback related to the data from at least one of the UEs, and an evaluation module 830 configured to determine whether to retransmit the data based on the feedback. The modules are hardware and/or software. The computer program product may be stored on a computer-readable recording medium such as memory 640.

Other Enhancements for V2x

Figure 9:
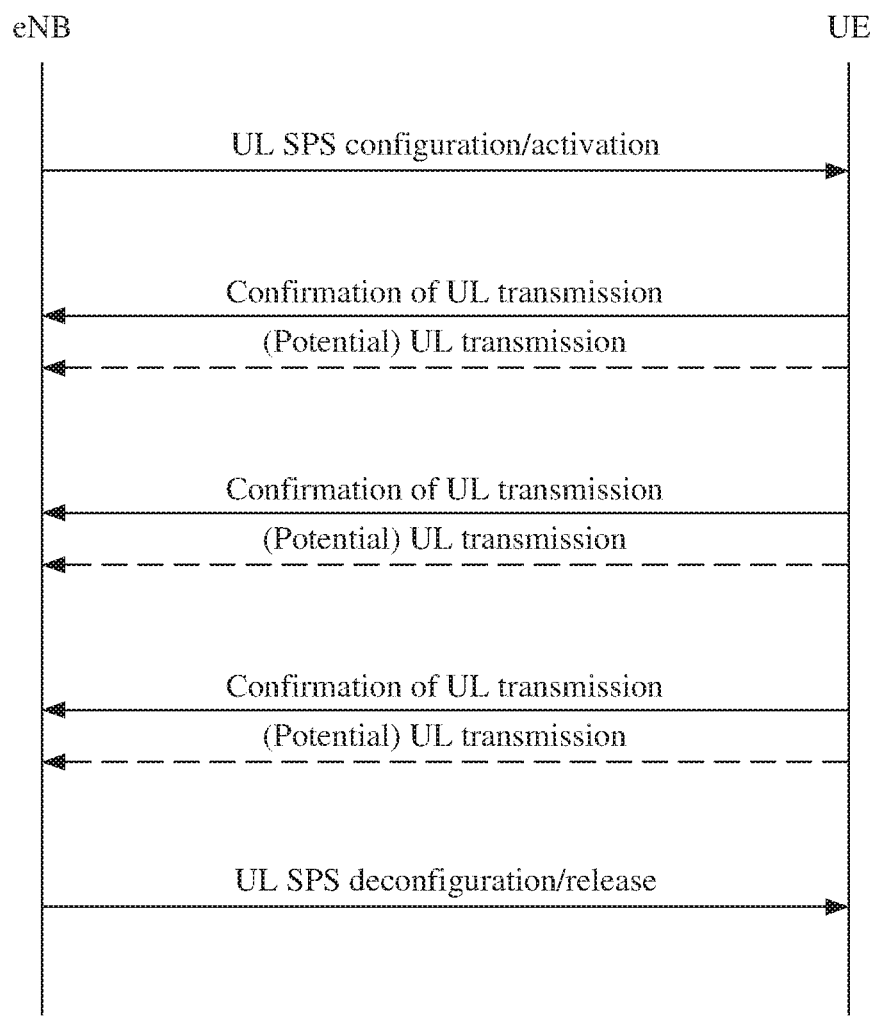
FIG. 9 illustrates a protocol according to an embodiment.

FIG. 9 illustrates a feedback protocol according to an embodiment. In order to cope with irregular traffic, an UE is configured to acknowledge individual transmissions that are scheduled in a semi-persistent way. The acknowledgment is carried on a PUCCH prior to the actual transmission. The eNB has the chance to reuse unacknowledged resources for other purposes. The UE has to acknowledge each transmission scheduled by the eNB with SPS. The eNB may reuse unacknowledged SPS resources for other purposes.

Signaling of the UL acknowledgments of next transmission (SPS_UL_Tx_ACK) may be sent as close in time to the actual potential transmission as possible and efficiently from an overhead and reliability perspective. The eNB may schedule some other transmission in those resources. Since these are UL resources, scheduling has to be done in advance.

A mechanism similar to the existing framework for ACK/NACK UL signaling for SPS may be reused, where UE-specific periodic PUCCH resources are configured by the eNB. Legacy mechanisms for multiplexing UL control information on PUCCH/PUSCH may be reused with minimal changes. For example, in one embodiment, the PUCCH resource for SPS_UL_Tx_ACK is RRC-configured by the eNB in a UE-specific manner. Any existing PUCCH format may be reused since it is only 1 bit/UE. In the case of PUSCH and PUCCH in the same subframe, the SPS_UL_Tx_ACK may be appended to any of the other UL control information carried on PUSCH (e.g., the CSI).

In some embodiments, UL acknowledgments of next transmission are carried by PUCCH or PUSCH (when configured) in UE-specific RRC-configured resources. For PUCCH, one of the existing formats may be reused with no changes at L1. For PUSCH the UL acknowledgments of next transmission bit may be appended to other L1 control information carried by PUSCH (e.g., to the CSI report, if any).

Providing acknowledgments for the DL transmissions is a useful enhancement of DL multicast by improving reliability (in which case a NACK is likely followed by a retransmission) and providing delivery reports to higher layers (in which case a retransmission is not implied). The retransmissions may be unicast or multicast, depending on whether MBSFN or SC-PTM is used and up to eNB decision. Embodiments may provide a flexible framework for ACK/NACK reporting in UE-specific UL channels or in a common shared UL PUCCH report (in which case only NACK would be signaled with energy detection).

The eNB can configure different types of L1 A/N feedback for DL multicast transmissions: a UE-specific ACK/NACK on UE-specific RRC-configured resources using PUCCH/PUSCH, or TMGI-specific NACK on RRC-configured TMGI-specific resources using at least PUCCH/PUSCH.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter may include other examples that occur to those skilled in the art. Such other examples are intended to be within the scope of the present application.

The invention claimed is:

1. A method performed by a User Equipment, UE, the method comprising:
receiving data from a network node on a Multicast Traffic Channel, MTCH;
transmitting feedback related to the data received on the MTCH to the network node; and
receiving a retransmission of the data by one of multicast or unicast from the network node,
wherein the retransmission of the data from the network node is based on a comparison of an energy detected on a Physical Uplink Control Channel, PUCCH, resource associated with the MTCH with at least two thresholds.

2. The method of claim 1, further comprising:
receiving an indication of a table associating Physical Uplink Control Channel, PUCCH, resources with MTCHs respectively, prior to the receiving of said data,
wherein the feedback is transmitted on a PUCCH resource, which, according to the table, is associated with the MTCH on which the data was received.

3. The method of claim 2, wherein the indication of the table is received via a broadcast message, via Radio Resource Control, RRC, signaling, or via dedicated signaling.

4. The method of claim 2, wherein the table associates the MTCH with a first PUCCH resource used when the feedback is a positive acknowledgment, and/or
the table associates the MTCH with a second PUCCH resource used when the feedback is a negative acknowledgment.

5. The method of claim 2, where at least one PUCCH resource is represented as a phase rotation and an orthogonal cover sequence.

6. The method of claim 2, further comprising:
evaluating an UE-dependent criterion to select a PUCCH resource among two or more PUCCH resources associated with the MTCH according to the table, the selected PUCCH resource being then used to transmit the feedback.

7. The method of claim 6, wherein the evaluating of the UE-dependent criterion includes performing a measurement.

8. The method of claim 7, wherein the measurement is a Reference Signal Received Power, RSRP, measurement.

9. The method of claim 2, wherein the table associates at least one PUCCH resource with the MTCH corresponding to a Temporary Mobile Group Identifier, TMGI, of a multicast session that the UE is monitoring.

10. The method of claim 1, further comprising:
determining whether the data was received with one or more errors, wherein,
if determined that the data was received with one of more errors, the feedback is a negative acknowledgment.

11. The method of claim 10, further comprising receiving a retransmission of the data.

12. The method of claim 11, wherein the retransmission is received by multi-cast.

13. The method of claim 11, wherein the retransmission is received by unicast.

14. The method of claim 1, wherein the feedback comprises one or more of:
a CQI for the MTCH;
a CSI for the MTCH; and
a ARQ- or HARQ-related positive or negative acknowledgment.

15. The method of claim 1, wherein the UE performing the method operates in a Radio Resource Control, RRC, connected mode.

16. A non-transitory computer readable storage medium storing computer-executable instructions, which when executed by a processor, cause the processor to perform the method of claim 1, the computer-executable instructions comprising at least:
a receiving module configured to receive the data from the network node on the MTCH; and
a transmitting module configured to transmit the feedback related to the data received on the MTCH to the network node.

17. A User Equipment, UE, comprising a receiver, a transmitter, a processor and a memory storing instructions executable by the processor, wherein the processor executing the instructions performs a method comprising:
controlling the receiver to receive data from a network node on a Multicast Traffic Channel, MTCH;
controlling the transmitter to transmit feedback related to the data received on the MTCH to the network node; and
controlling the receiver to receive a retransmission of the data by one of multicast or unicast from the network node,
wherein the retransmission of the data from the network node is based on a comparison of an energy detected on a Physical Uplink Control Channel, PUCCH, resource associated with the MTCH with at least two thresholds.

18. The UE of claim 17, wherein the processor receives an indication of a table associating Physical Uplink Control Channel, PUCCH, resources with MTCHs respectively, prior to the receiving of said data, wherein the feedback is transmitted on a PUCCH resource, which, according to the table, is associated with the MTCH on which the data was received.

19. The UE of claim 17, wherein the UE is wireless mobile device.

20. The UE of claim 17, wherein the UE is one of:
a vehicle-mounted device; or
a pedestrian-carried device.

21. A method performed by a network node broadcasting or multicasting data to a plurality of User Equipment, UEs, the method comprising:
transmitting the data via a Multicast Traffic Channel, MTCH, to the UEs;
receiving feedback related to the data from at least one of the UEs,
wherein said receiving of the feedback includes detecting a received energy on a Physical Uplink Control Channel, PUCCH, resource associated with the MTCH; and
determining whether to retransmit the data based on the feedback,
wherein said determining of whether to retransmit the data includes comparing the detected received energy with at least one threshold,
wherein said comparing of the detected received energy includes comparing an energy detected on one PUCCH resource with at least two thresholds, and
wherein the method further comprising selecting, based on a result of the comparing with the at least two thresholds
to retransmit the data by multicast; and/or
to retransmit the data by unicast directed to one or more of the UEs from which a negative acknowledgment has been received.

22. The method of claim 21, further comprising:
sending an indication of a table associating PUCCH resources with MTCHs respectively, prior to transmitting said data, wherein the feedback is received on a PUCCH resource, which, according to the table, is associated with the MTCH on which said data was transmitted.

23. The method of claim 22, wherein:
said receiving of the feedback includes detecting a first energy received on a first PUCCH resource and a second energy received on a second PUCCH resource, the first and second PUCCH resources being associated with the MTCH according to the table; and said determining of whether to retransmit the data includes comparing the first energy with the second received energy.

24. The method of claim 22, wherein the table associates the MTCH with two or more PUCCH resources to be selected for feedback based on a UE-dependent criterion.

25. The method of claim 24, wherein said receiving of the feedback comprises:
receiving a positive feedback from a UE fulfilling the UE-dependent criterion on a first one of said PUCCH resources; and/or
receiving a negative feedback from a UE not fulfilling the UE-dependent criterion on a second one of said PUCCH resources.

26. The method of claim 24, further comprising:
selecting a Modulation Coding Scheme, MCS, for retransmitting the data based on estimating a number of UEs which fulfil the UE-dependent criterion and from which the received feedback is a negative acknowledgment.

27. The method of claim 22, wherein the table further associates the MTCH and with a Temporary Mobile Group Identifier, TMGI.

28. The method of claim 21, further comprising selecting, based on the result of the comparing with the at least two thresholds, not to retransmit the data.

29. The method of claim 21, wherein the at least one of the threshold is determined based on a number of UEs in the plurality of UEs.

30. The method of claim 21, wherein:
two or more MTCHs are used to transmit data to the UEs, each of the two or more MTCHs being associated with a logical channel index, LCID; and
the feedback is received in a predefined format in which fields are populated with MTCH-wise feedback entries according to a predefined rule dependent on LCIDs associated with the MTCHs, respectively.

31. The method of claim 30, wherein the predefined format is PUCCH format 1b.

32. The method of claim 21, wherein the feedback comprises one or more of:
a ARQ- or HARQ-related positive or negative acknowledgment;
a combination of ARQ- or HARQ-related positive and negative acknowledgments;
a CQI for the MTCH; and
a CSI for the MTCH.

33. The method of claim 21, wherein at least one PUCCH resource is represented as a phase rotation and an orthogonal cover sequence, and wherein the feedback is received on the at least one PUCCH resource.

34. The method of claim 21, further comprising:
if determined that data is to be retransmitted, selecting whether to retransmit the data by unicast or multi-cast.

35. A non-transitory computer readable storage medium storing computer-executable instructions, which when executed by a processor, cause the processor for performing the method of claim 21, the computer-executable instructions comprising at least:
a transmitting module configured to broadcast or multi-cast the data via the MTCH, to the plurality of the UEs;
a receiving module configured to receive the feedback related to the data from at least one of the UEs; and
an evaluation module configured to determine whether to retransmit the data based on the feedback.

36. A network node comprising a receiver, a transmitter, a processor and a memory storing instructions executable by the processor, wherein the processor executing the instructions performs a method comprising:
controlling the transmitter to transmit data to a plurality of UEs via a MTCH;
controlling the receiver to receive feedback relating to the transmitted data from at least one of the UEs,
wherein said receiving of the feedback includes detecting a received energy on a Physical Uplink Control Channel, PUCCH, resource associated with the MTCH; and
determining whether to retransmit the data based on the feedback,
wherein said determining of whether to retransmit the data includes comparing the detected received energy with at least one threshold,
wherein said comparing of the detected received energy includes comparing an energy detected on one PUCCH resource with at least two thresholds,
wherein the method further comprising selecting, based on a result of the comparing with the at least two thresholds
to retransmit the data by multicast; and/or
to retransmit the data by unicast directed to one or more of the UEs from which a negative acknowledgment has been received.

37. The network node of claim 36, wherein the processor sends an indication of a table associating PUCCH resources with MTCHs respectively, prior to transmitting said data, wherein the feedback is received on a PUCCH resource, which, according to the table, is associated with the MTCH on which said data was transmitted.

38. The network node of claim 36, wherein the network node is a base station.

39. The network node of claim 36, wherein the network node is one of:
a centralized application server; and/or
a stationary transportation infrastructure entity.

* * * * *